July 29, 1941.   H. W. LORMOR   2,250,490
BATTERY DUMPING MECHANISM
Filed March 1, 1939   3 Sheets-Sheet 1
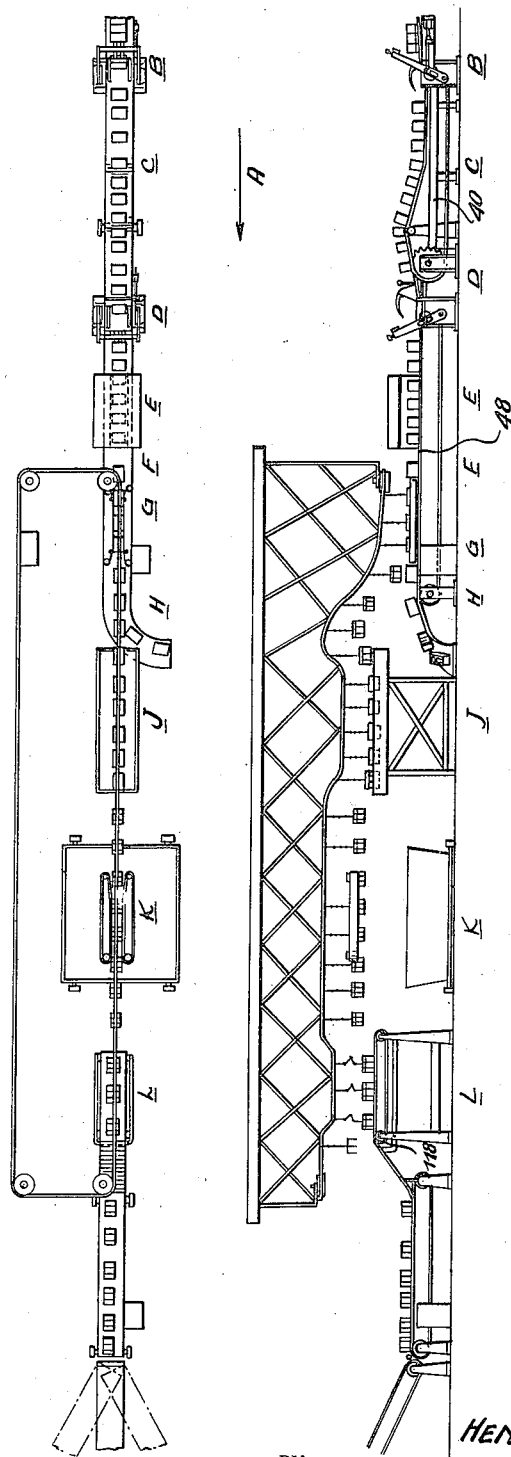
INVENTOR.
HENRY W. LORMOR
BY
Kuris Hudson Kent
ATTORNEYS July 29, 1941.  H. W. LORMOR  2,250,490
BATTERY DUMPING MECHANISM
Filed March 1, 1939  3 Sheets-Sheet 2
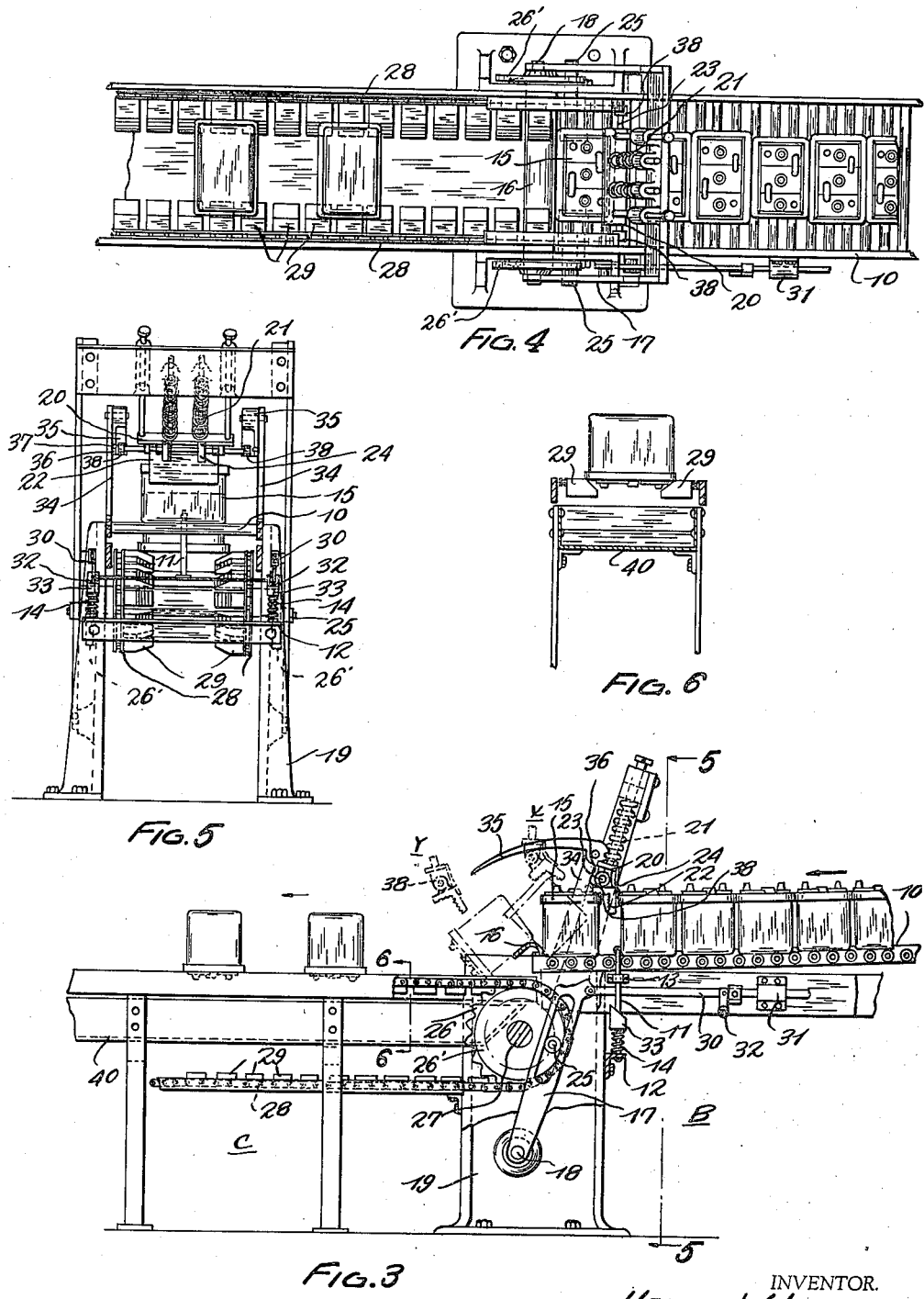
INVENTOR.
HENRY W. LORMOR
BY
Kwis Hudson & Kent
ATTORNEYS July 29, 1941.	H. W. LORMOR	2,250,490
BATTERY DUMPING MECHANISM
Filed March 1, 1939	3 Sheets-Sheet 3

INVENTOR.
HENRY W. LORMOR
BY Kwis Hudson & Kent
ATTORNEYS

Patented July 29, 1941

2,250,490

UNITED STATES PATENT OFFICE 2,250,490

BATTERY DUMPING MECHANISM

Henry W. Lormor, Cleveland Heights, Ohio, assignor to Willard Storage Battery Company, Cleveland, Ohio, a corporation of West Virginia Application March 1, 1939, Serial No. 259,301

6 Claims. (Cl. 214—1.1)

This invention relates to improvements in battery dumping mechanism, being designed primarily for the employment in battery dismantling apparatus, that is apparatus for salvaging or otherwise disposing of the various materials included in used storage batteries for automobiles.

One of the objects of the present invention is the provision of apparatus adapted to function with a minimum number of attendants, for inverting the battery boxes, dumping the electrolyte and returning the boxes to upright position.

Other objects and features of novelty will appear as I proceed with the description of that embodiment of the invention which, for the purposes of the present application, I have illustrated in the accompanying drawings, in which, Fig. 1 is a diagrammatic elevational view of battery dismantling apparatus embodying the invention.

Fig. 2 is a plan view of the same.

Fig. 3 is an elevational view on a larger scale illustrating automatic means for inverting the batteries in order to dump out their liquid contents.

Fig. 4 is a plan view of the same.

Fig. 5 is an end view partly in section substantially on the line 5—5 of Fig. 3.

Fig. 6 is a cross sectional view taken substantially on the line 6—6 of Fig. 3.

Figures 7, 8:
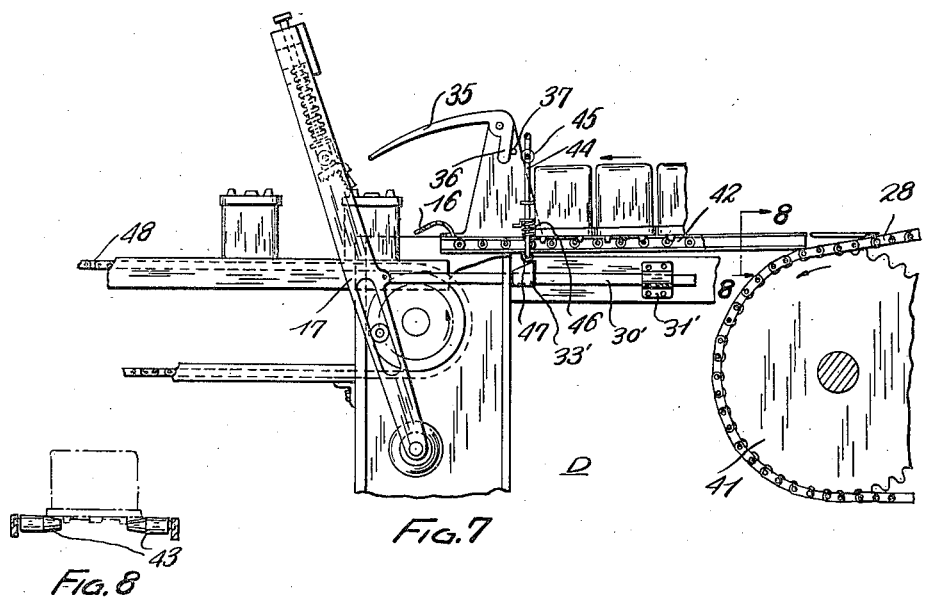
Fig. 7 is an elevational view of a similar mechanism for turning the emptied batteries over again into upright position.
Fig. 8 is a vertical cross section taken substantially on the line 8—8 of Fig. 7.

In Figs. 1 and 2, which are general views of the complete apparatus, the direction of travel of the batteries is indicated by arrow A. At station B the batteries are inverted one after another so as to dump the electrolyte at station C. At station D the batteries are again turned over so that they may be deposited right side up onto a conveyor which carries them through a heating compartment at station E, where the sealing compound is melted. Up to this time the batteries have been arranged with their short dimensions or width parallel to the path of travel. Since the width of all makes of automobile batteries is uniform in accordance with standards established by the Society of Automotive Engineers, the inverting mechanism at stations B and D function best with transversely arranged batteries. After the batteries leave station E however they are turned through an angle of 90° by hand at station F, and at the same time and place the element assembly of each battery, that is the three groups of plates which are mechanically and electrically joined by connectors, is grasped by the gripping elements of a hanger on an overhead conveyor.

Preferably the hangers are provided with four depending grippers for attachment to the two terminal posts of the battery and to the two connectors joining the central element with the end elements. The stripping of the battery elements from the battery box takes place at station G, where the boxes are held to a horizontal course while the hangers move on an upwardly inclined portion of the overhead conveyor. The empty boxes are shunted laterally at station H. The element assemblies are immersed in wash water at station J. The cell covers which remain on the elment assemblies when they are stripped from the boxes are removed at station K by being passed through moving breaker or crusher teeth set a trifle closer together than the length of the cell covers, which of course are transverse to the path of travel and have a uniform length for all batteries. The covers which are ordinarily formed of hard rubber and are quite brittle are easily broken away by this crushing operation and fall down into a truck or hopper. The suspended element assemblies then include nothing but lead alloy metal and lead oxides, except for the separators. The latter are frequently made of wood or other combustible material, and if made of non-combustible material they readily separate and come to the top of the molten mass in a smelting furnace. At station L the grippers are automatically released or opened and from that station the hangers travel back to the other end of the overhead conveyor, while the element assemblies move away down a chute or the like to storage space or to a conveyor arranged to deliver them to a smelting furnace.

Referring now to Figs. 3, 4 and 5, 10 is an inclined roller table upon which the batteries are placed by an attendant with their uniform short dimensions parallel to the path of travel. The inclination of the table is sufficient to cause the batteries to move forward by the force of gravity. A stop rod 11 slidably mounted in guides 12 and 13, urged upwardly by spring means 14, normally extends upwardly between two adjacent rollers of the table far enough to prevent all batteries behind it from moving forward on the table. A single battery marked 15 in the drawings rests upon the table in front of the stop 11, and its front lower corner engages an abutment 16 at the forward end of the table. 17 is an oscillating arm which in practice conveniently takes the form of an inverted U-frame straddling the table 10 and pivoted at its lower end 18 to opposite sides of a fixed standard 19. In the oscillating arm 17 there is a slide 20 pressed downwardly by one or more springs 21. From this slide an angular catch 22 is pivotally suspended upon a shaft 23 carried by the slide. Backward swinging of the catch 22 is opposed by one or more leaf springs 24.

The oscillating arm 17 is swung backward and forward by pins 25 mounted eccentrically on discs 26' fixed to shaft 27 and working in slots in the arms. As shown herein there are two sprockets 26 fixed to opposite ends of a shaft 27 journaled in the standard 19, and the pin and slot driving connection is used at both ends of the shaft 27. Over these two sprockets there run chains 28, each link of which is provided with an inwardly extending battery supporting lug 29. To one side of the oscillating arm 17 there is pivotally connected a rod 30 the rear end of which slides in a guide 31, which is so formed as to provide a sufficiently loose slide bearing to accommodate the necessary varying angularity of the rod. This rod carries a small roller 32 pivotally mounted thereon but backed up against swinging movement in one direction by an abutment fixed to the rod. When the arm 17 swings forward from the position illustrated the roller 32 moves forward and near the end of its forward travel engages the inclined upper face of a cam block 33 fixed to rod 11 and depresses that rod, thereby retracting stop 11 sufficiently to permit a battery to pass over it. On the return stroke the roller 32 is free to swing up over the cam block 33.

At the opposite sides of the standard 19 there are upwardly extending brackets 34 upon which are pivotally supported a pair of forwardly projecting cams 35 which have downwardly extending integral arms 36 (see Fig. 7) that are adapted to engage stop pins 37 carried by the brackets in order to limit the downward swing of the cams.

When the parts are in the position illustrated in Fig. 3 the catch 22 is in engagement with the upper rear corner of the battery. As the pin 25 moves in an anti-clockwise direction the catch 22 moves into closer engagement with the battery and then begins to tilt up the battery, with the forward lower corner of the same acting as a fulcrum. As this occurs the slide 20 is forced upwardly somewhat in the arm 17 against the pressure of springs 21, and the catch 22 swings rearwardly to a slight extent against the action of leaf springs 24, as indicated by dotted lines at position X. The shaft 23 carries a pair of anti-friction rollers 38 which are arranged to engage the lower surfaces of cams 35 and swing them upwardly out of the way if necessary on the forward stroke. When the arm 17 reaches its foremost position, indicated by the dotted lines Y in Fig. 3, the battery swings down over the abutment 16 and assumes an inverted position upon the conveyor 28, 29. Cams 35 have then swung down to their normal positions determined by stops 37, and as the arm 17 swings rearwardly the rollers 38 ride up onto the upper surfaces of cams 35, which gradually raise the slide 20 against the pressure of springs 21. In the foremost position of the oscillating arm the stop 11 is withdrawn, so that at about the same time that one battery is turning over the abutment 16 another battery is moving forward over the retracted stop 11. By the time the second battery clears the stop 11 however the roller 32 has retreated behind cam block 33 and accordingly the stop 11 immediately rises and interrupts the descent of the other batteries on the table. Before the arm reaches its rearmost position the second battery is in place against the abutment 16, and as soon as the rollers 38 move over the rear ends of the cams 35 the springs 21 force the slide 20 downward and cause the catch 22 to engage the battery that is then in position for being inverted. All of this procedure is entirely automatic.

The upper run of conveyor 28, 29 carries the inverted batteries over a pan or tank 40 which receives the electrolyte as it drains from the batteries, it being understood that the vent plugs had been removed by attendants before or after the batteries were deposited upon table 10.

The chains 28 at their forward ends run over sprockets 41, Fig. 7, and deliver the inverted batteries onto another roller table 42 arranged at about the same inclination as table 10 but differing from that table in that the rollers shown at 43 in Fig. 8 are merely short stub rollers, this being desirable because the terminal posts and cell connectors of batteries as a rule project to some extent above the walls of the battery case and would afford an unstable surface to rest upon an ordinary roller table like that of Fig. 3.

Inasmuch as the batteries in their inverted positions do not present a flat under surface, they are not adapted to pass smoothly over an upwardly extending stop like the stop 11 of Fig. 3. Consequently for station D, I provide a stop that is adapted to ride over the upper flat surfaces of inverted batteries, that is to say the bottoms of the batteries. For this purpose I employ an inverted U-frame 44 carrying a roller 45, the frame being normally depressed by a spring or springs 46 to bring the roller 45 into position in front of a battery slightly below the uppermost portion thereof. This frame 44 is arranged to be raised by cam blocks 33' secured upon rods 30' mounted to slide in guides 31', these parts being duplicated on the two sides of the apparatus. Anti-friction rollers 47 at the bottom of the frame 44 cooperate with the cam blocks 33' to raise the stop when the oscillating arm is in the foremost position of its stroke as illustrated in Fig. 7. As shown in that figure, the foremost battery on the table 42 is about to start forward. As soon as the arm 17 moves backward a short distance the cams 33' will move out from under the rollers 47, and the roller 45 will descend and rest upon the inverted bottom of the battery. As soon as that battery moves past the roller 44 the latter will drop down under the influence of springs 46 and stop the motion of the remaining batteries then on the table 42.

Having thus described my invention, I claim:

1. In apparatus of the character described, a carrier upon which batteries are supported for forward movement, an upstanding projection at the forward end of the carrier against which the forward lower corner of a battery is adapted to engage and over which it is adapted to be turned, a catch adapted to engage the opposite corner of the battery, means for moving said catch forwardly to turn said battery forward and down over said projection, and means for returning the catch to its original position through a higher path whereby the catch clears the next battery and comes into position above the rear upper corner of that battery.

2. In apparatus of the character described, a carrier upon which batteries are supported for forward movement, an upstanding projection at the forward end of the carrier against which the forward lower corner of a battery is adapted to engage and over which it is adapted to be turned, a forwardly and backwardly oscillating arm having a pivoted catch adapted to engage the opposite corner of the battery, whereby as the arm swings forward the battery is swung forward and down over said projection, and means for raising said catch in the oscillating arm as the latter swings rearwardly, whereby the catch clears the next battery and comes into position above the rear upper corner of that battery.

3. In apparatus of the character described, a carrier upon which batteries are supported for forward movement, an upstanding projection at the forward end of the carrier against which the forward lower corner of a battery is adapted to engage and over which it is adapted to be turned, a forwardly and backwardly oscillating arm having a pivoted catch adapted to engage the opposite corner of the battery, whereby as the arm swings forward the battery is swung forward and down over said projection, means for raising said catch in the oscillating arm as the latter swings rearwardly, whereby the catch clears the next succeeding battery and comes into position above the rear upper corner of that battery, a stop for engaging the succeeeding battery and holding it in spaced relation with the battery being turned, and means actuated in timed relation with the movement of said oscillating arm for projecting and retracting said stop in order to permit the succeeding battery to move forward into position against said upstanding projection after the first named battery has been turned over the projection.

4. In apparatus of the character described, a carrier upon which batteries are supported for forward movement, an upstanding projection at the forward end of the carrier against which the forward lower corner of a battery is adapted to engage and over which it is adapted to be turned, an arm mounted to oscillate forwardly and backwardly, a slide in said arm spring-pressed downwardly, a catch pivoted to said slide adapted to engage the opposite corner of the battery, whereby as the arm swings forward the battery is swung forward and down over said projection, and cam means for raising said slide as the arm swings backwardly, whereby the catch clears the next battery and comes into position above the rear corner thereof.

5. In apparatus of the character described, a carrier upon which batteries are supported for forward movement, an upstanding projection at the forward end of the carrier against which the forward lower corner of a battery is adapted to engage and over which it is adapted to be turned, an arm mounted to oscillate forward and backward, a slide in said arm spring-pressed downwardly, a catch pivoted to said slide adapted to engage the opposite corner of the battery, whereby as the arm swings forward the battery is swung forward and down over said projection, and a cam for raising said slide as the arm swings backwardly, said cam being supported exclusively by a pivot at its rear end and being free to swing upwardly out of the way when the arm moves forwardly.

6. In apparatus of the character described, a carrier upon which batteries are supported for forward movement, an upstanding projection at the forward end of the carrier against which the forward lower corner of a battery is adapted to engage and over which it is adapted to be turned, an arm mounted to oscillate forwardly and backwardly, a catch for the opposite corner of the battery pivotally suspended in the arm and spring-pressed forwardly, whereby as the arm swings forward the battery is swung forward and down over said projection, and means for raising said catch in the oscillating arm as the latter swings rearwardly, whereby the catch clears the next battery and comes into position above the rear upper corner thereof.

HENRY W. LORMOR.